Patented Nov. 8, 1949

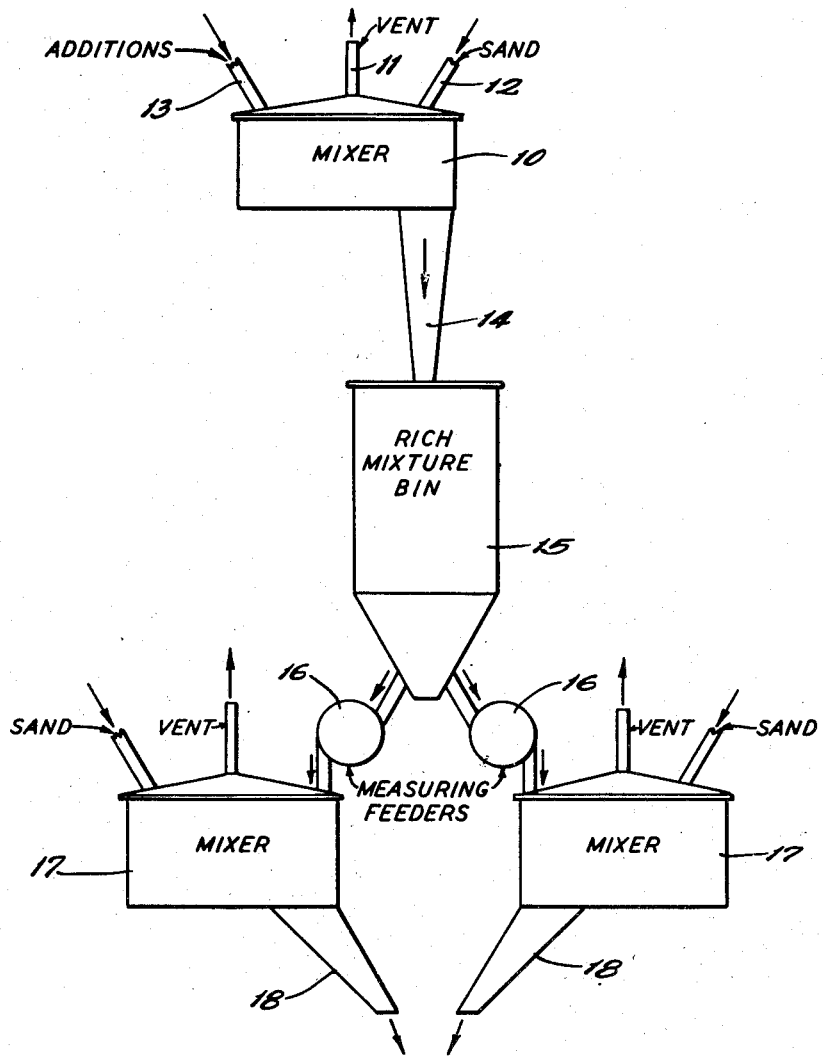

2,487,139

UNITED STATES PATENT OFFICE 2,487,139

FOUNDRY SAND PREPARATION PROCESS

Arthur F. Jackson and Claude B. Schneible, Detroit, Mich., assignors to said Schneible, as trustee Application March 23, 1946, Serial No. 656,734

5 Claims. (Cl. 22—217)

This invention relates to a foundry sand preparation process, and is particularly useful in the preparation of a foundry sand mix for the making of molds, cores, and the like. The process may also be used for other purposes.

In the preparation of foundry sand mixes, the sand is mixed with addition products comprising binders, such as clay, cereal products, etc., and materials for improving the surface of the castings, such as sea coal, petroleum products, etc. The sand is weighed or measured into a mixer (either batch or continuous), and a measured amount of water is mixed with it. The above additions are then added and the whole thoroughly mixed again. A ventilation system is necessary in the above mixing operation because of the tremendous amount of dust, including the dry cereal products, etc., developed in the mixing step. The process is unsatisfactory because of the loss of considerable dry ingredients in the operation of the ventilating system, and further because the method virtually requires two mixings. Further, the large amounts of material which are mixed in the operation are not mixed with the accuracy desired.

An object of the present invention is to provide a process which will virtually eliminate the loss of the dry ingredients and which will bring about the mixing of the material with greater accuracy. A further object of the invention is to provide a process which will speed up the mixing operation, while at the same time preventing the loss of dry ingredients, etc. Yet another object is to provide a process whereby an enriched mixture is made available for quick mixing with any desired amount of sand when a molding sand mix is required so that a minimum of time is required for the final mixing operation. Yet another object is to provide a process in which a preliminary mixing step is employed for the forming of a rich mixture containing a small proportion of the sand to be used and a high percentage of addition products with water whereby there is substantially no loss of the dry ingredients while at the same time furnishing an enriched mixture for ready combining with the remaining sand needed for the final mix. Other specific objects and advantages will appear as the specification proceeds.

Suitable apparatus which may be employed with the process herein described is set out in the accompanying drawing, in which the figure sets out schematically an arrangement whereby the results herein described may be obtained. As indicated in the drawing, a mixer 10, which may be of the usual type employed and which is provided with the usual vent 11, may be supplied with a relatively small proportion of sand through conduit 12 and with substantially all the additions required through pipe 13. The additions will include water, binders, such as clay, cereal products, etc., and surface-forming materials, such as sea coal, petroleum products, etc. The resulting mixture within mixer 10 is, therefore, rich in additions and in moisture. The rich mixture may then be passed through conduit 14 to the rich mixture bin 15 from which it may be fed through measuring or metering feeders 16 to the final mixers 17. At the final mixers 17, the remainder of the sand to be employed is added, and also, if desired, some make-up moisture may be added. The final product from mixers 10 may be fed through discharge conduits 18 to receptacles or to points where the material is to be used.

In the above-described process where the initial mixture is rich in additions and in water, there is substantially no loss of dry substance, and the dry ingredients are combined readily in the rich mixture fed to bin 15 after the first mixing operation. The amount of sand incorporated in the first mixing operation is substantially less than the total amount of sand required for the final mix, but may be varied considerably. With respect to the additions, we prefer to add substantially all of the additions to the initial mixer 10. If all of the additions are not added at this point, we prefer at least to add the binders or other materials, including the dry ingredients, so that there will be no loss of these ingredients by virtue of the forming of the rich mixture in mixer 10. In the preferred operation, all of the additions are introduced into mixer 10, and there incorporated with but a portion of the total sand to be used. The initial mixer may be operated at periods prior to the time when the final mix is required and an accumulated amount of rich mixture built up within the bin 15. Later, in plant operations, when the final product is required, a quick final mixing operation is insured through the feeding of the mixture from bin 15 into the final mixers 17 by means of the measuring feeders 16.

The process may be carried out continuously or as a batch process, using either continuous apparatus as is commonly employed in present processes or batch apparatus of the type now commonly employed in batch operations. Whether employed continuously or in batch operations, the process saves time, results in a more accurate mixing of the materials, and eliminates the loss heretofore experienced of dry ingredients.

In the operation of the process, we have obtained excellent results when the proportion of the sand used in the initial mixing operation for forming the enriched mixture batch was less than fifty per cent of the total sand employed in forming the final product. However, greater amounts of sand may be employed in the practice of the invention. We have also obtained excellent results by employing cold sand in forming the enriched mixture. We have found that cold sand markedly improves the final product, not only in the initial mixing operation but also is improving the temperature (desired low) of the final sand mixture. While we have described the use of water, it will be understood that other liquids may be employed satisfactorily, and, in fact, no liquid at all may at times be employed.

While in the foregoing specification we have described the apparatus in detail and have set out a number of steps as desirable, it will be understood that such details may be varied widely by those skilled in the art and substitute steps employed for those described without departing from the spirit of our invention.

We claim:

1. In the preparation of foundry sand mixes for making molds, cores, and the like, the steps of mixing a portion of the same to be used with substantially all of the binders including cereal products employed and moisture to form a mixture rich in binders and moistures, and mixing the rich mixture with the remaining sand to be used.

2. In the preparation of foundry sand mixes for making molds, cores, and the like, the steps of preliminarily mixing binders and other addition products including dry cereal products with water to form an intimate mixture, combining with the mixture rich in water a portion only of the sand to be used in the final product, and then mixing the resulting rich mixture with the remaining sand to be used.

3. In the preparation of a sand mix containing binders and other additions, the step of mixing additions including dry cereal products preliminarily with water and with a relatively minor portion of the sand to be used in the final mix whereby a mixture rich in additions and moisture and relatively poor in sand is obtained, and mixing the resulting mixture with the remaining sand required for the final product.

4. In the preparation of a sand mix containing binders and other additions, the steps of mixing the additions including dry cereal products with a portion only of the sand to be employed in the final mix whereby a mixture rich in additions and moisture and relatively poor in sand is obtained, and mixing the resulting mixture with the remaning sand required for the final product.

5. In the preparation of foundry sand mixes for making molds, cores, and the like, the steps of mixing a portion of the sand to be used with substantially all of the additions including dry cereal products employed to form a rich mixture rich in moisture, and mixing the rich mixture with the remaining sand required for the final product, at least a portion of the sand employed in the first mixing step being cold sand.

ARTHUR F. JACKSON.
CLAUDE B. SCHNEIBLE.

REFERENCES CITED

The following references are of record in the file of this patent:

UNITED STATES PATENTS

| Number | Name | Date |
|---|---|---|
| 1,561,956 | Thomas | Nov. 17, 1925 |
| 1,808,161 | Fisher | June 2, 1931 |
| 1,879,272 | Inkley | Sept. 27, 1932 |
| 2,398,047 | Schmidt | Apr. 9, 1946 |

OTHER REFERENCES

"Am. Synthetic Sand Practice," by Dunbeck, Trans. of Am. Foundrymen's Assoc., vol. 49, pages 155 and 156.